US010910893B2

(12) United States Patent
Kolehmainen et al.

(10) Patent No.: US 10,910,893 B2
(45) Date of Patent: Feb. 2, 2021

(54) ROTOR FOR ROTATING ELECTRIC MACHINE

(71) Applicant: ABB Schweiz AG, Baden (CH)

(72) Inventors: Jere Kolehmainen, Vaasa (FI); Tero Kansakangas, Vaasa (FI); Pietro Savio Termini, Vittuone (IT)

(73) Assignee: ABB Schweiz AG, Baden (CH)

( * ) Notice: Subject to any disclaimer, the term of this patent is extended or adjusted under 35 U.S.C. 154(b) by 17 days.

(21) Appl. No.: 15/750,394

(22) PCT Filed: Jun. 24, 2016

(86) PCT No.: PCT/EP2016/064709
§ 371 (c)(1),
(2) Date: Feb. 5, 2018

(87) PCT Pub. No.: WO2017/021058
PCT Pub. Date: Feb. 9, 2017

(65) Prior Publication Data
US 2018/0226848 A1    Aug. 9, 2018

(30) Foreign Application Priority Data
Aug. 5, 2015   (EP) .................................. 15179850

(51) Int. Cl.
*H02K 1/24*      (2006.01)
*H02K 17/16*     (2006.01)
(Continued)

(52) U.S. Cl.
CPC ............. *H02K 1/246* (2013.01); *H02K 17/16* (2013.01); *H02K 19/14* (2013.01); *H02K 1/276* (2013.01); *H02K 2213/03* (2013.01)

(58) Field of Classification Search
CPC ...... H02K 1/246; H02K 1/276; H02K 1/2766; H02K 1/02; H02K 2213/03; H02K 19/14;
(Continued)

(56) References Cited

U.S. PATENT DOCUMENTS 6,058,596 A        5/2000  Jansen et al.
2003/0111927 A1    6/2003  Takita et al.
(Continued)

FOREIGN PATENT DOCUMENTS

DE   102014201740 A1   8/2014
WO      2014118321 A2   8/2014

OTHER PUBLICATIONS

China National Intellectual Property Administration, Office Action in corresponding Application No. 201680045451.4, dated Jun. 26, 2019, 17 pp.
(Continued)

*Primary Examiner* — Quyen P Leung
*Assistant Examiner* — Alexander A Singh
(74) *Attorney, Agent, or Firm* — Taft Stettinius & Hollister LLP; J. Bruce Schelkopf

(57) ABSTRACT

A rotor for a synchronous reluctance machine having an even number 2 p of poles circumferentially spaced at an angle α, with α=2 π/2 p, the rotor comprising a substantially cylindrical laminate stack having a plurality of magnetically conductive laminations. One or more of the magnetically conductive laminations includes non-magnetic flux barriers which are spaced from each other in the radial direction, one or more of the non-magnetic flux barriers having a first and second bridge transversally positioned in correspondence of their lateral ends and defining a first and a second air-gap with the outer rim of the magnetically conductive lamination, and further including a third and a fourth bridge transversally positioned and respectively defining together
(Continued)

with the first and second bridge a first and a second internal space which are filled with an electrically conductive and non-magnetically conductive material.

14 Claims, 5 Drawing Sheets

(51) Int. Cl.
  *H02K 19/14* (2006.01)
  *H02K 1/27* (2006.01)
(58) Field of Classification Search
  CPC .... H02K 19/103; H02K 17/205; H02K 17/20; H02K 17/16; H02K 17/165; H02K 17/18; H02K 17/185; H02K 15/0012; B22D 19/0054
  USPC ............. 310/156.83, 156.84, 156.53, 156.57
  See application file for complete search history.

(56) References Cited

U.S. PATENT DOCUMENTS

| | | | | |
|---|---|---|---|---|
| 2007/0126304 A1* | 6/2007 | Ito | ........................ | H02K 1/2766 310/156.53 |
| 2012/0200188 A1* | 8/2012 | Sano | .................... | H02K 1/2766 310/156.38 |
| 2012/0267977 A1* | 10/2012 | Merwerth | ............ | H02K 1/2766 310/156.53 |
| 2015/0145371 A1* | 5/2015 | Kim | ..................... | H02K 1/2766 310/156.53 |
| 2015/0372577 A1 | 12/2015 | Haussmann et al. | | |

OTHER PUBLICATIONS

European Patent Office, International Search Report & Written Opinion issued in corresponding Application No. PCT/EP2016/064709, dated Oct. 14, 2016, 11 pp.

European Patent Office, Extended Search Report issued in corresponding Application No. 15179850.1, dated Jan. 20, 2016, 8 pp.

* cited by examiner

ROTOR FOR ROTATING ELECTRIC MACHINE

The present invention relates to a rotor for a rotating machine, in particular to a rotor for a synchronous reluctance machine. More in particular, the present invention relates to a rotor for a synchronous reluctance machine having improved performances during both start-up and synchronous state.

Rotors for synchronous reluctance machines of known type are typically formed by a substantially cylindrical laminate stack having a plurality of magnetically conductive laminations which comprise flux conducting sections as well as flux barrier sections, thereby forming one or more pole pairs. The flux conducting sections and the flux barrier sections differ from one another to a varying degree of magnetic permeability, the section having a high magnetic conductivity being generally designated as the d-axis of the rotor, and the section having a comparably lower magnetic conductivity being generally designated as the q-axis of the rotor. An optimal torque yield is achieved when the d-axis has a magnetic conductivity as high as possible while the q-axis has a magnetic conductivity as low as possible.

In practice, this is normally achieved by making cut-outs of proper shape in the magnetically conductive lamination along the q-axis; the cut-outs are filled with air, whereby the magnetic flux is inhibited in the direction of the q-axis and, as a consequence, the permeability decreases.

For line starting or direct-online (DOL) versions of the synchronous reluctance motors, known solutions foresee a cage structure buried inside the laminate stack and obtained by filling the cut-out portions of the magnetically conductive laminations with, e.g., aluminum or copper.

However, it has been shown by simulations and literature that fully filled synchronous reluctance motors have problems due to heavy losses on the tips of the flux barriers close to the air-gap; moreover, manufacturing costs are increased due to use of more than necessary amount of raw material (e.g. aluminum or copper).

Hence, the present disclosure is aimed at providing a rotor for a synchronous reluctance machine which allows overcoming the above mentioned shortcomings.

In particular, the present invention is aimed at providing a rotor for a synchronous reluctance machine with improved start-up and synchronous operation performances.

As a further aim, the present invention is aimed at providing a rotor for a synchronous reluctance machine with reduced manufacturing times and costs.

Thus, the present invention relates to a rotor for a synchronous reluctance machine having an even number 2 p of poles, said rotor comprising a substantially cylindrical laminate stack having a plurality of magnetically conductive laminations. The rotor according to the invention is characterized in that one or more of said magnetically conductive laminations comprises non-magnetic flux barriers which are spaced apart from each other in the radial direction, one or more of said non-magnetic flux barriers having a first magnetically conductive bridge which defines a first air-gap with the outer rim of said magnetically conductive lamination; furthermore, one or more of said non-magnetic flux barriers comprises a third magnetically conductive bridge which defines together with said first magnetically conductive bridge a first internal space which is filled with an electrically conductive and magnetically non conductive material.

As better explained in the following description, thanks to the particular structure and functionality of the rotor for a synchronous reluctance machine according to the present invention, the motor operation performance is greatly improved.

In practice, the cage resulting from the electrically conductive and magnetically non conductive material filling a part of the flux barriers has a relatively limited size—with consequent material costs savings—and at the same time improves motor performance in both operation sets: start-up and synchronous state. Moreover, the cage also holds the rotor lamination structure together, making the manufacturing of the rotor similar to the manufacturing of rotors for conventional induction motor and greatly simplified with respect to conventional synchronous reluctance machine rotors, as there is no need of stud bolts and/or end plates to keep the structure together.

In addition, it was seen that the relatively small air-gap between the outer rim of the rotor and the cage decreases the amount of harmonic losses induced into the cage during the steady state synchronous operation, thereby improving the Direct On Line Synchronous Reluctance Motor performance.

In this respect, the outer rim of said magnetically conductive lamination can be continuous or can be interrupted in correspondence of one or more of said air-gaps. In other words, the air gaps can be delimited by an "external bridge" defined by the outer rim of said magnetically conductive lamination or they can be left "open" toward the exterior, since the cage itself can provide the required mechanical support.

The magnetic flux barriers can be symmetrically or not-symmetrically positioned with respect to the center of each pole ($P_1$, $P_x$). For the purposes of the present invention, the center of the pole is taken on the axis $R_x$ of comparably lower magnetic conductivity.

A rotating machine, in particular a synchronous reluctance machine, comprising a rotor according to the present disclosure is also part of the present invention.

According to a particular embodiment of the rotor of the present invention, the poles are circumferentially spaced at an angle $\alpha$, with $\alpha=2 \pi/2 p$, and the non-magnetic flux barriers are symmetrically positioned with respect to the center of each pole ($P_1$, $P_x$). Moreover, one or more of said non-magnetic flux barriers further comprises a second magnetically conductive bridge defining a second air-gap with the outer rim of said magnetically conductive lamination, and further comprises a fourth magnetically conductive bridge defining together with said second bridge a second internal space which is filled with an electrically conductive and magnetically non conductive material.

Each pair of first and second air-gaps in the same flux barrier is normally symmetrical, i.e. the air-gaps at the opposite lateral ends of the same flux barrier normally have the same shape and dimensions.

Advantageously, in the magnetically conductive laminations of the rotor according to the invention, the third and fourth bridge define with respect to each other a third internal space, which is preferably left void. In practice, according to such embodiment, the flux barriers are cut-out portions of the magnetically conductive lamination and the first and second internal space in the flux barriers are filled with the material constituting the cage (i.e. the electrically conductive and magnetically non conductive material), while the third internal space is left void for better cooling of the rotor and improved synchronous operation.

However, it is also possible to fill, at least partially, the third internal space with an electrically conductive and magnetically non conductive material and/or with permanent magnets. To this purpose, it is also possible to have further bridges that divide the third internal space in two or more spaces that can be filled with an electrically conductive and magnetically non conductive material and/or with permanent magnets.

Preferably, the flux barriers in the magnetically conductive laminations of the rotor according to the invention are substantially arc-shaped. For the purposes of the present invention, the term "substantially arc-shaped" is meant to include also, e.g., flux barriers constituted by a relatively high number of straight segments.

However, one or more of said non-magnetic flux barriers can also be substantially straight line-shaped. Non-magnetic flux barriers comprising a plurality of straight segments are also possible.

In a largely preferred embodiments of the rotor according to the present invention, the average width of said first and second air-gaps increases when moving from the center of pole toward its periphery. For the purposes of the present invention, the average width of the first (or second) air-gap is considered as the average distance between the outer rim of the magnetically conductive lamination and the first (or second) bridge. In practice, in the presence of a plurality of flux barriers and a corresponding plurality of air-gaps circumferentially distributed on both sides of the pole center (i.e. clockwise and counterclockwise with respect to a plan view of the magnetically conductive lamination), the average width of the air-gaps progressively increases.

In other terms, as better explained in the detailed description, said first and second air-gaps are progressively positioned at angles $\beta_n$ with respect to the center of the pole, with $0<\beta_n \leq \alpha/2$.

Thus, when the magnetically conductive lamination comprise a number n of non-magnetic flux barriers $FB_1$, $FB_2$, ..., $FB_n$, such barriers will form a corresponding number n of first air-gaps (firstAG$_1$, firstAG$_2$, ..., firstAG$_n$) and second air-gaps (secondAG$_1$, secondAG$_2$, ..., secondAG$_n$) which are respectively positioned clockwise and counterclockwise at intermediate angular positions $\beta_1$, $\beta_2$, ..., $\beta_n$ with respect to the center of the pole, with $\beta_1 > \beta_2 > \ldots > \beta_n$. The average width $d_1$, $d_2$, ..., $d_n$ of each pair of air gaps (i.e., firstAG$_1$-secondAG$_1$, firstAG$_2$-secondAG$_2$, ..., firstAG$_n$-secondAG$_n$) of the flux barriers $FB_1$, $FB_2$, ..., $FB_n$ is such that $d_1 > d_2 > \ldots > d_n$.

According to a particular embodiment of rotor according to the present invention, said one or more magnetically conductive laminations further comprises a continuous non-magnetic flux barrier which is positioned radially external with respect to the others non-magnetic flux barriers. In other words, said continuous non-magnetic flux barrier is the closest to the external circumference of the magnetically conductive lamination in correspondence of the pole center.

In such a case, said continuous non-magnetic flux barrier can be conveniently filled with an electrically conductive and magnetically non conductive material, which is preferably selected from Aluminum, Copper and electrically conductive resins, and/or with permanent magnets.

In general, examples of electrically conductive and magnetically non conductive materials that can be used to fill said first and second internal space formed into said flux barriers, are Aluminum, Copper and electrically conductive resins. Other materials having similar electric and magnetic properties can also be used.

In a further preferred embodiment of the rotor according to the invention, said one or more magnetically conductive laminations comprise a number n of non-magnetic flux barriers $FB_1$, $FB_2$, ..., $FB_n$, the corresponding third bridges (thirdBR$_1$, thirdBR$_2$, ..., thirdBR$_n$) and fourth bridges (fourthBR$_1$, fourthBR$_2$, ..., fourthBR$_n$) being respectively positioned at a distance $L_1$, $L_2$, ..., $L_n$ from the center pole axis ($R_x$), where $L_1$ is the distance referred to the non-magnetic flux barriers radially more internal and $L_n$ is the distance referred to the non-magnetic flux barriers radially more external, and in which $L_1 > L_2 > \ldots > L_n$, in this way, it is possible to ensure a balanced contribution of cage bars during the asynchronous starting.

Further features and advantages of the present invention will be more clear from the description of preferred but not exclusive embodiments of a rotor for a synchronous reluctance machine according to the invention, shown by way of examples in the accompanying drawings, wherein.

Figure 5:
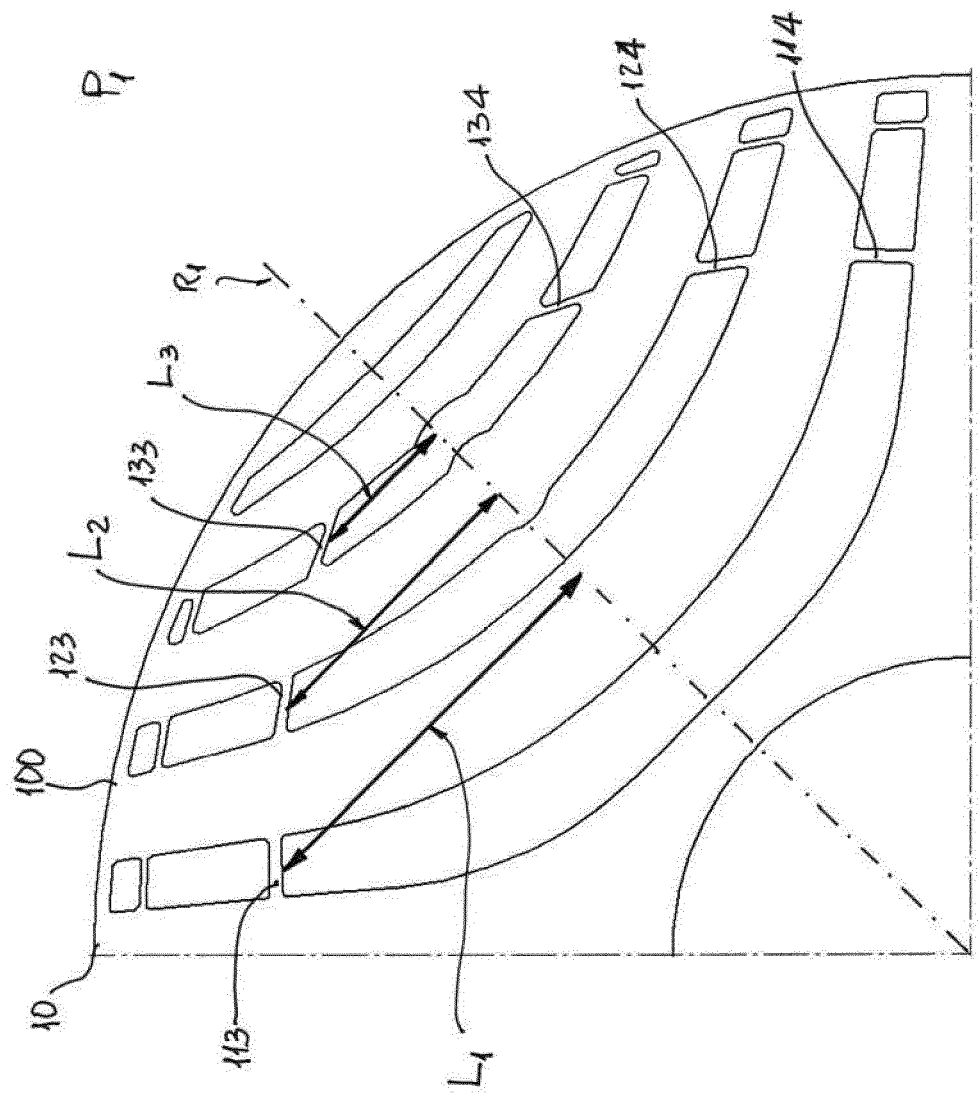

FIG. 5 is a third partial view showing some details of a magnetically conductive lamination in a rotor for a synchronous reluctance electrical machine according to the invention The rotor according to the invention is used in synchronous reluctance machine having an even number 2 p of poles ($P_1$, ..., $P_x$) circumferentially spaced at angles $\alpha$, with $\alpha = 2\pi/2$ p. In the following detailed description and in the attached figures, for sake of simplicity, the present invention will be described with reference to a rotor for a four poles synchronous reluctance electrical machine (i.e. with a number of pole pairs p=2). The same structure can of course be replicated in rotors with a different number of poles (e.g. two or six).

With reference to the attached figures, according to a specific embodiment of the present invention, the rotor for a synchronous reluctance electrical machine, generally designated with the reference numeral 1, has four of poles $P_1$, $P_2$, $P_3$, $P_4$ circumferentially spaced at an angle $\alpha = 90°$.

The rotor 1 comprises a substantially cylindrical laminate stack 2 having a plurality of magnetically conductive laminations 10. One of the characterizing features of the rotor 1 according to the present invention is given by the fact that one or more of said magnetically conductive laminations 10 comprises non-magnetic flux barriers 11, 12, 13 which are symmetrically positioned with respect to the center of each pole $P_1$, $P_2$, $P_3$, $P_4$ and spaced apart from each other in the radial direction. The flux barriers 11, 12, 13 can be conveniently obtained as cut-out portions of the magnetically conductive laminations 10.

In the embodiment shown in the attached figures, the non-magnetic flux barriers 11, 12, 13 are substantially arc-shaped with the convexity facing toward the center of the rotor 1. Other shapes are also possible, e.g., flux barriers comprising a plurality of straight segments substantially reproducing the arc-shaped structure shown in the figures.

A further characterizing feature of the rotor 1 according to the present invention is given by the fact that each of said non-magnetic flux barrier 11, 12, 13 has a first 111, 121, 131 and a second 112, 122, 132 bridge which are transversally positioned in correspondence of their lateral ends.

Said first bridges 111, 121, 131 respectively form first air-gaps 21, 31, 41 with the outer rim 100 of the magnetically conductive lamination 10, while said second bridges 112, 122, 132 respectively form second air-gaps 22, 32, 42 with the outer rim 100 of the magnetically conductive lamination 10.

In the embodiments shown in the figures, the outer rim 100 of the magnetically conductive lamination 10 is continuous, so that the first and second air gaps are delimited by an "external bridge" defined by the outer rim of said magnetically conductive lamination. Alternative solutions, not shown in the figures, in which the first and second air gaps are open toward the external part of the rotor 1 (i.e. the outer rim 100 of the magnetically conductive lamination 10 is not-continuous, but it is interrupted in correspondence of one or more of the first and second air gaps) are also possible.

Furthermore, each of said non-magnetic flux barrier 11, 12, 13 has a third bridge 113, 123, 133 and a fourth bridge 114, 124, 134 which are transversally positioned and spaced apart from respectively said first 111, 121, 131 and second 112, 122, 132 bridges.

As clearly shown in the attached figure, the third bridge 113, 123, 133 forms together with the corresponding first bridge 111, 121, 131 a first internal space 51, 61, 71 which is filled with an electrically conductive and magnetically non conductive material, while the fourth bridge 114, 124, 134 form together with the corresponding second bridge 112, 122, 132 a second 52, 62, 72 internal space which is also filled with an electrically conductive and non-magnetically conductive material.

The electrically conductive and magnetically non conductive material filling said first 51, 61, 71 and a second internal space 52, 62, 72 can be, for example, Aluminum, Copper or an electrically conductive resin. Other materials having the desired electric and magnetic properties also can be used.

Thus, in practice, in the rotor 1 according to the invention, a cage with a relatively limited size is formed inside the substantially cylindrical laminate stack 2 by the electrically conductive and magnetically non conductive material filling the first 51, 61, 71 and second 52, 62, 72 internal spaces of the flux barriers 11, 12, 13. At the same time, an air-gap 21, 31, 41 and 22, 32, 42 is formed in the tips of the flux barriers 11, 12, 13 close to surface of the rotor 1, between the outer rim 100 of the magnetically conductive lamination 10 and the cage, so as to minimize losses in the cage caused by air-gap harmonics.

Figure 1:
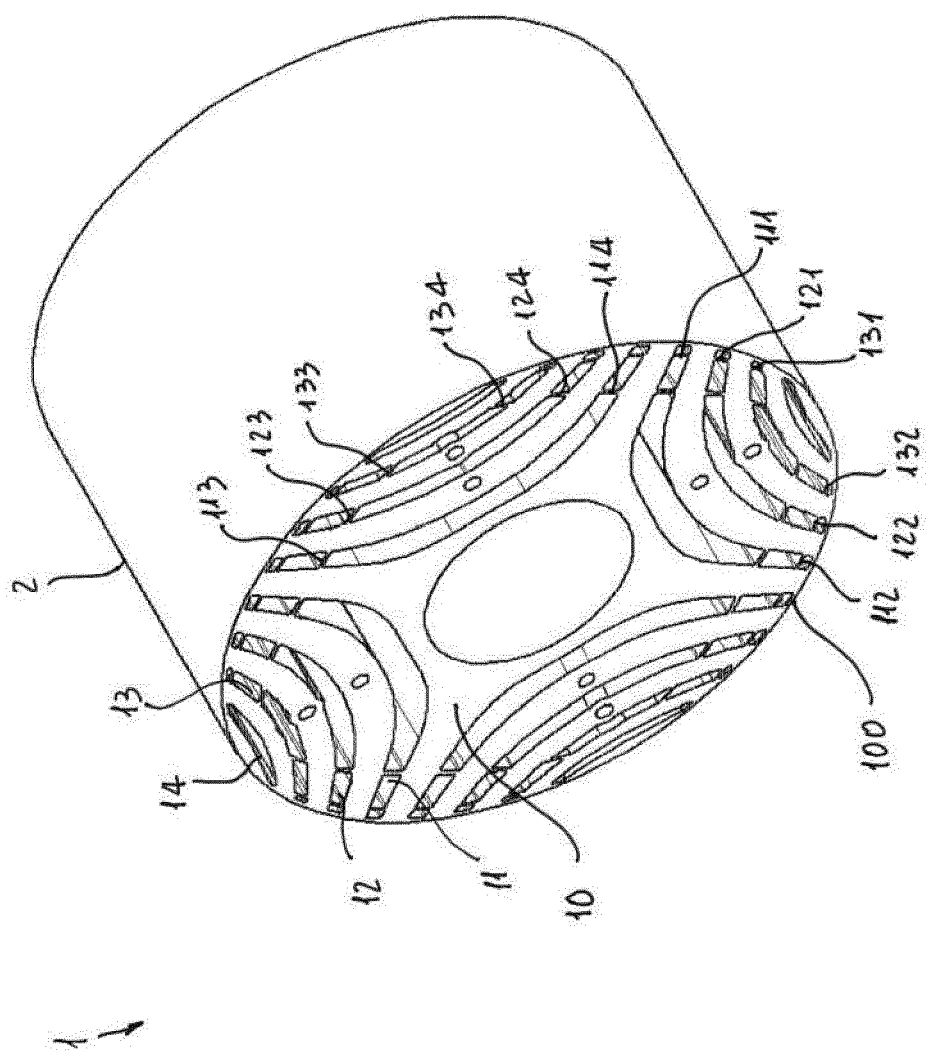
FIG. 1 is a perspective view of a first general embodiment of a rotor for a synchronous reluctance machine according to the invention.
Figure 2:
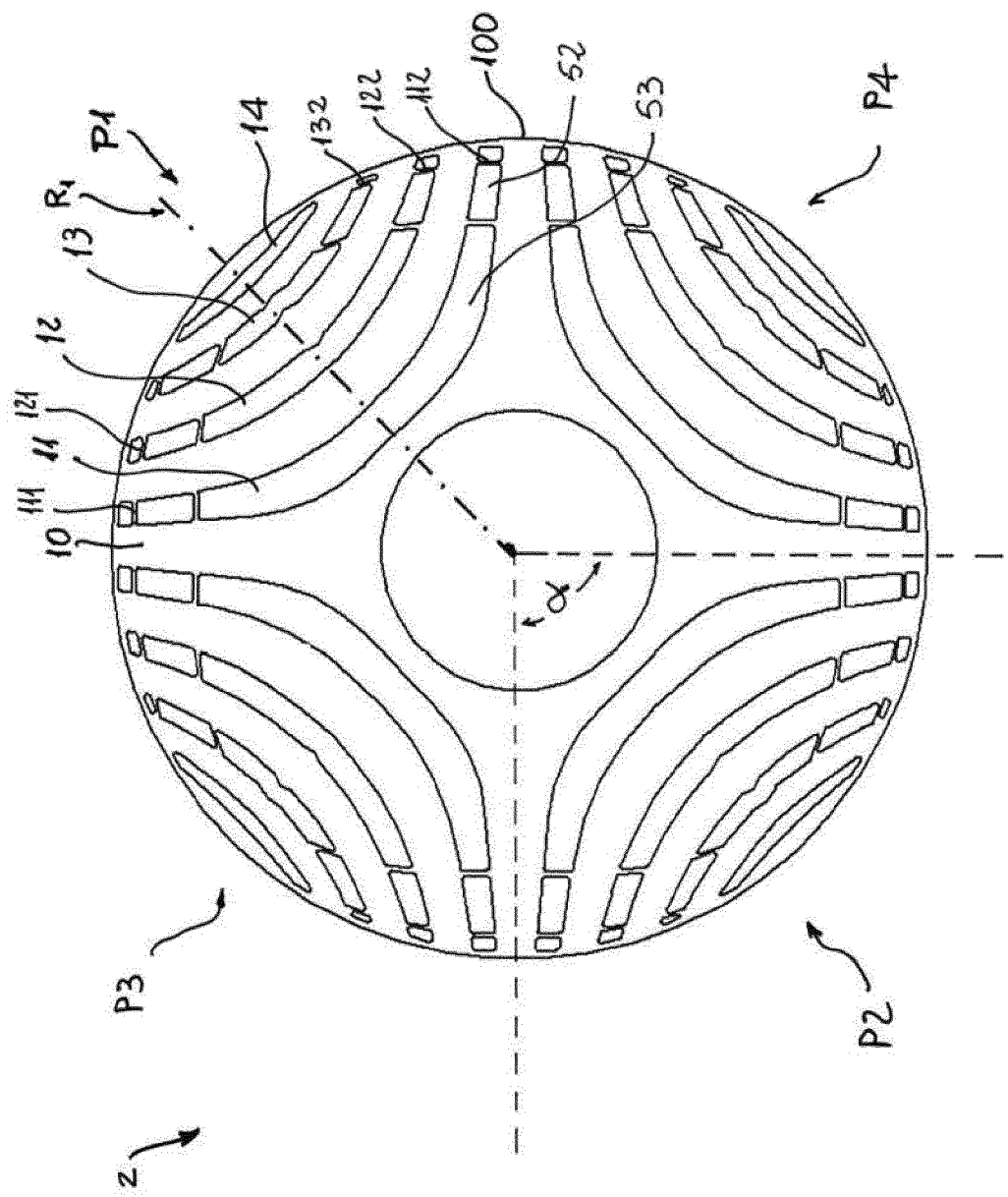
FIG. 2 is a plane view of a magnetically conductive lamination in the rotor for a synchronous reluctance electrical machine of FIG. 1.
Figure 3:
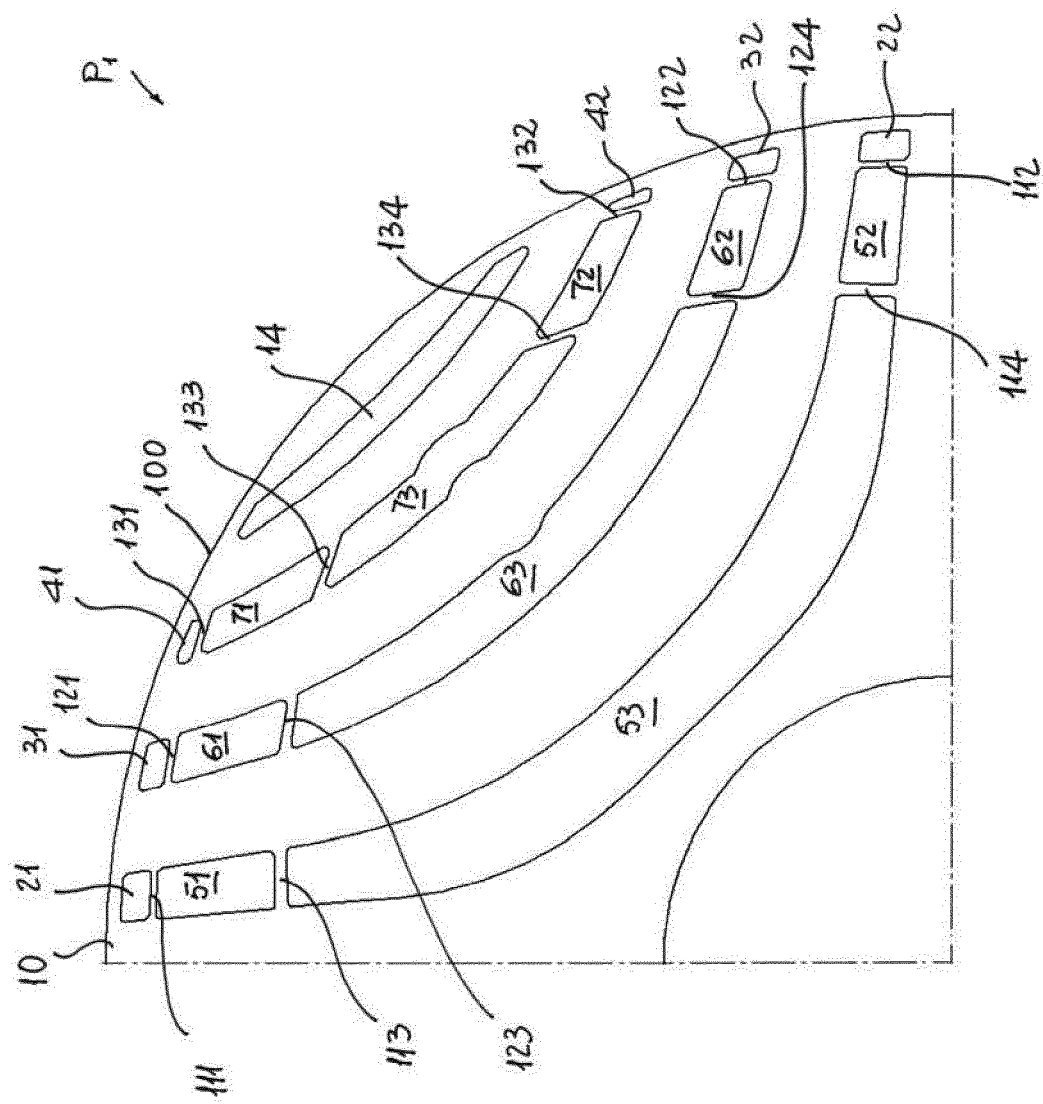
FIG. 3 is a first partial view showing some details of an embodiment of a magnetically conductive lamination in a rotor for a synchronous reluctance electrical machine according to the invention.

According to a largely preferred embodiment of the rotor 1 according to the present invention, the average width of said first 21, 31, 41 and second 22, 32, 42 air-gaps increases when moving from the center of pole $P_x$ toward its periphery. Thus, with reference to FIG. 3, starting from the center of the pole $P_1$ and moving counterclockwise, the average width of the air-gaps increases from the air-gap 41, to the air-gap 31, and to the air-gap 21, while moving clockwise, the average width of the air-gaps increases from the air-gap 42, to the air-gap 32, and to the air-gap 22.

In general, it has been seen that such an increase of the air-gaps width greatly improves the start-up features.

As the air-gaps 21, 31, 41 and 22, 32, 42 normally do not have a uniform width (e.g. they can have a trapezoidal shape, or a curved segment delimiting them with respect to the outer rim 100 of the magnetically conductive lamination 10), for the purposes of the present invention their average width is considered as the average between the minimum and maximum distance between the bridges 111, 121, 131, 112, 122, 132 and the outer rim 100 of the magnetically conductive lamination 10.

Each pair of first and second air-gaps 21, 31, 41 and 22, 32, 42 is normally symmetrical, i.e. the air-gaps 21 and 22 normally have the same shape and dimensions, and the same for the air gaps 31-32, and 41-42.

Figure 4:
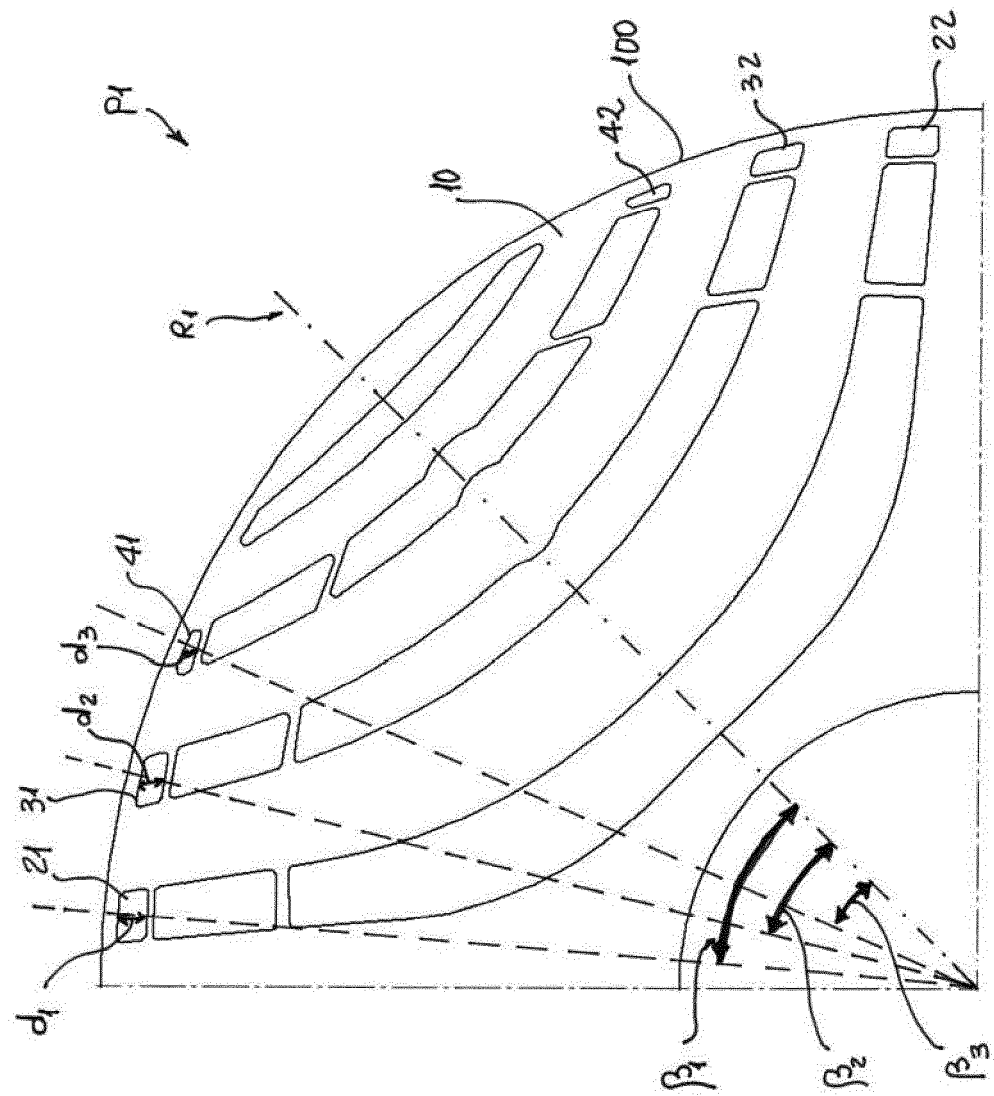
FIG. 4 is a second partial view showing some details of a magnetically conductive lamination in a rotor for a synchronous reluctance electrical machine according to the invention.

Preferably, as shown in FIG. 4, the magnetically conductive lamination 10 can comprise a number n of non-magnetic flux barriers 11, 12, 13 which form a corresponding number n of first 21, 31, 41 and second 22, 32, 42 air-gaps together with the outer rim 100 of the magnetically conductive lamination 10. In the case of FIG. 4, the air-gaps 21 and 22 have the same average width $d_1$, the air-gaps 31 and 32 have the same average width $d_2$, and the air-gaps 41 and 42 have the same average width $d_3$.

In the embodiment of FIG. 4, the air-gaps 21 and 22 are positioned at an angular position $\beta_1$ with respect to the center pole axis $R_1$, the air-gaps 31 and 32 are positioned at an angular positions $\beta_2$ with respect to the center pole axis $R_1$, and the air-gaps 41 and 42 are positioned at an angular positions $\beta_3$ with respect to the center pole axis $R_1$, with $\beta_1 > \beta_2 > \beta_3$ (for sake of simplicity the angles $\beta_1, \beta_2, \beta_3$ formed by the air gaps 22, 32, 42 are not shown in FIG. 4).

Thus, when moving from the said center pole axis $R_1$ toward the pole periphery (i.e., 45° counterclockwise for the first air-gaps 21, 31, 41, and 45° clockwise for the second air-gaps 22, 32, 42), the average width increases and $d_3 < d_2 < d_1$.

Thus, more in general, when the magnetically conductive lamination 10 comprises a number n of air-gaps having average width $d_n$, and progressively positioned at intermediate angles $\beta_n$ with respect to the center pole axis $R_x$, with $0 < \beta_n \leq \alpha/2$, the general rule is that $d_n$ increases when $\beta_n$ increases.

For the purposes of the present invention, the angle $\beta_n$ is measured taking as a reference with respect to the center pole axis $R_x$ the straight line connecting the mid-point of the relevant first bridge (111, 121, 131 and 112, 122, 132) with the center of the magnetically conductive lamination 10.

In a particular embodiment of the rotor 1 according to the present invention said one or more magnetically conductive laminations 10 further comprises a continuous non-magnetic flux barrier 14 which is positioned radially external with respect to the others non-magnetic flux barriers 11, 12, 13. Here the term "continuous" is meant to designate a non-magnetic flux barrier which is not interrupted by bridges or in any other way.

In practice, according to this embodiment, the continuous non-magnetic flux barrier 14 is the closest to the outer rim 100 of the magnetically conductive lamination 10, and is positioned at mid-point of the sector of amplitude a covered by the pole $P_x$ and symmetrically with respect to the center pole axis R.

The continuous non-magnetic flux barrier 14 can be left void or it can be filled with an electrically conductive and magnetically non conductive material, thereby forming part of the cage. The electrically conductive and magnetically non conductive material is preferably selected from Aluminum, Copper and electrically conductive resins.

Alternatively, or in addition to the electrically conductive and magnetically non conductive material, the continuous non-magnetic flux barrier 14 can also be filled, partially or totally, with a permanent magnet material.

In the embodiment of the rotor 1 according to the present invention, said third 113, 123, 133 and 114, 124, 134 fourth bridge define with respect to each other a third internal space 53, 63, 73.

In a highly preferred embodiment of the present invention, said third internal space 53, 63, 73 is preferably void so as to improve cooling of the system and the operation at synchronous state.

Alternatively, the third internal space 53, 63, 73 can be at least partially filled with an electrically conductive and magnetically non conductive material and/or with a permanent magnet material.

In a particular embodiment of the rotor 1 of the present invention, not shown in the attached figures, the non-magnetic flux barriers 11, 12, 13 of the magnetically conductive laminations 10 can have one or more further bridges which are transversally positioned in said third internal space 53, 63, 73 and divide it in further internal sub-spaces.

In practice, it can be convenient sometimes to divide the third internal space 53, 63, 73 of the non-magnetic flux barriers 11, 12, 13 into further compartments, some or all of which can be filled an electrically conductive and magnetically non conductive material, e.g. Aluminum, Copper, electrically conductive resins or similar materials, thereby forming part of the cage. Alternatively or in addition, some or all of said further compartments can be filled with a permanent magnet material.

In a further preferred embodiment of the rotor 1 according to the present invention, described with reference to FIG. 5, the magnetically conductive lamination 10 comprises a number n (with n=3) of non-magnetic flux barriers 11, 12, 13 having first, second, third, and fourth bridges, first and second air-gaps, and first and second internal spaces filled with an electrically conductive and magnetically non conductive material, as well as a continuous non-magnetic flux barrier positioned radially external with respect to the others non-magnetic flux barriers 11, 12, 13.

In such embodiment, the third 113, 123, 133 and fourth 114, 124, 134 bridges of the non-magnetic flux barriers 11, 12, 13 are positioned at a distance $L_1, L_2, L_3$ from the center pole axis $R_1$, where $L_1$ is the distance of the bridge 113 from the center pole axis $R_1$, $L_2$ is the distance of the bridge 123 from the center pole axis $R_1$ and $L_3$ is the distance of the bridge 133 from the center pole axis $R_1$. As clearly shown in FIG. 5, in such embodiment $L_1 > L_2 > L_3$ (for sake of simplicity the distances $L_1, L_2, L_3$ of the fourth bridges 114, 124, 134 from the center pole axis $R_1$ are not shown in FIG. 5).

Thus, more in general, it can be said that when the magnetically conductive lamination 10 comprises a number n greater than 1 of non-magnetic flux barriers, the corresponding third bridges and fourth bridges are respectively positioned at a distance $L_1, L_2, \ldots, L_n$ from the corresponding center pole axis $R_x$, where $L_1$ is the distance referred to the non-magnetic flux barriers radially more internal and $L_n$ is the distance referred to the non-magnetic flux barriers radially more external, and in which $L_1 > L_2 > \ldots > L_n$. Such a solution is highly convenient as it ensures a balanced contribution of cage bars during the asynchronous starting.

For the purposes of the present invention, the distance $L_n$ is here considered as the distance taken perpendicularly from the mid-point of the relevant bridge to the center pole axis R.

As clearly shown in the above description, the rotor for a synchronous reluctance machine of the present invention fully achieves the intended aims.

In particular, from a manufacturing standpoint, the limited size cage obtained by filling only partially the non-magnetic flux barriers, i.e. by filling only the first and a second internal space of the non-magnetic flux barriers with, e.g., aluminum, allows considerable cost savings in terms of raw material costs.

Moreover, in terms of manufacturing technology, by using casting techniques it is possible to obtain a casted cage that holds the rotor together, thereby making conventional stud bolts and end plates unnecessary. Alternatively, instead of a cast cage is possible to build such cage by using prefabricated conductor bars to be inserted in the first and second internal spaces and end rings.

From an operation standpoint, the rotor for a synchronous reluctance machine according to the invention allows improving motor performance in both operation sets: start-up and synchronous state. In particular, the first and second air-gaps in the flux barriers between the outer rim of the rotor and the cage allows minimizing losses in cage and improves start-up features, while the inner core of the rotor which is substantially free of aluminum improves cooling and operation at synchronous state A rotating machine, in particular a synchronous reluctance machine, comprising a rotor as described herein is also part of the present invention.

Several variations can be made to the rotor for a synchronous reluctance machine thus conceived, all falling within the scope of the attached claims. In practice, the materials used and the contingent dimensions and shapes can be any, according to requirements and to the state of the art.

The invention claimed is:

1. A rotor for a synchronous reluctance machine having an even number 2p of poles, where p is the number of pole pairs, said rotor comprising:

a substantially cylindrical laminate stack having a plurality of magnetically conductive laminations, wherein one or more of said magnetically conductive laminations comprises non-magnetic flux barriers which are spaced from each other in the radial direction, one or more of said non-magnetic flux barriers having a first magnetically conductive bridge defining a first air-gap with an outer rim of the one or more of said magnetically conductive laminations, and further comprising a third magnetically conductive bridge defining together with said first magnetically conductive bridge a first internal space filled with an electrically conductive and magnetically non-conductive material, and wherein said poles are circumferentially spaced at an angle α, with α=2π/2p, and said non-magnetic flux barriers are symmetrically positioned with respect to the center of each pole ($P_1, P_x$), one or more of said non-magnetic flux barriers further comprising a second magnetically conductive bridge defining a second air-gap with the outer rim of said magnetically conductive lamination, and further comprising a fourth magnetically conductive bridge defining together with said second bridge a second internal space filled with an electrically conductive and magnetically non-conductive material, wherein said one or more magnetically conductive laminations comprise a number n of non-magnetic flux barriers forming a corresponding number n of first and second air-gaps having an average width $d_1, d_2, d_n$ and positioned at average angular positions $\beta_1, \beta_2, \beta_n$, with respect to a center of a pole axis ($R_x$), with $\beta_1 > \beta_2 > \beta_n$, said average width being $d_1 > d_2 > d_n$, and the pole axis ($R_x$) being the axis of comparably lower magnetic conductivity.

2. The rotor according to claim 1, wherein said third and fourth bridge define with respect to each other a third internal space.

3. The rotor according to claim 2, wherein said third internal space is void or it is at least partially filled with an electrically conductive and magnetically non conductive material and/or a permanent magnet material.

4. The rotor according to claim 2, wherein the outer rim of the one or more of said magnetically conductive laminations is interrupted in correspondence of one or more of said first and/or second air-gap;
wherein the average width of said first and second air-gaps increases when moving from the center of pole ($P_x$) toward its periphery;
wherein said first and second air-gaps are progressively positioned at angles $\beta_n$ with respect to the center of the poles axis ($R_x$), with $0<\beta_n\leq\alpha/2$; and
wherein said one or more magnetically conductive laminations further comprises a continuous non-magnetic flux barrier which is positioned radially external with respect to the others non-magnetic flux barriers.

5. The rotor according to claim 1, wherein one or more of said non-magnetic flux barriers are substantially arc-shaped and/or one or more of said non-magnetic flux barriers are substantially straight line-shaped.

6. The rotor according to claim 1, wherein the outer rim of the one or more of said magnetically conductive laminations is interrupted in correspondence of one or more of said first and/or second air-gap.

7. The rotor according to claim 1, wherein the average width of said first and second air-gaps increases when moving from the center of pole ($P_x$) toward its periphery.

8. The rotor according to claim 1, wherein said first and second air-gaps are progressively positioned at angles $\beta_n$ with respect to the center of the poles axis ($R_x$), with $0<\beta_n<\alpha/2$.

9. The rotor according to claim 1, wherein said one or more magnetically conductive laminations further comprises a continuous non-magnetic flux barrier which is positioned radially external with respect to the others non-magnetic flux barriers.

10. The rotor according to claim 9, wherein said continuous non-magnetic flux barrier is filled with an electrically conductive and magnetically non-conductive material.

11. The rotor according to claim 10, wherein said continuous non-magnetic flux barrier is filled with the electrically conductive and magnetically non-conductive material selected from Aluminium, Copper and electrically conductive resins and/or a permanent magnetic material.

12. The rotor according to claim 1, wherein said first and a second internal space are filled with an electrically conductive and magnetically non-conductive material selected from Aluminium, Copper and electrically conductive resins.

13. The rotor according to claim 1, wherein said one or more magnetically conductive laminations comprise a number n of non-magnetic flux barriers, the corresponding third and fourth bridges being positioned at a distance $L_1, L_2, L_n$ from the center pole axis ($R_x$), where $L_1$ is the distance referred to the non-magnetic flux barrier radially more internal and $L_n$ is the distance referred to the non-magnetic flux barrier radially more external, and in which $L_1>L_2>L_n$.

14. The rotor according to claim 1, further comprising a rotating machine.

* * * * *